US012631885B2

(12) United States Patent
Kake et al.

(10) Patent No.: US 12,631,885 B2
(45) Date of Patent: May 19, 2026

(54) DISPLAY CONTROL APPARATUS AND DISPLAY CONTROL METHOD

(71) Applicant: Sony Interactive Entertainment Inc., Tokyo (JP)

(72) Inventors: Tomokazu Kake, Tokyo (JP); Takayuki Ishida, Tokyo (JP); Akira Suzuki, Tokyo (JP); Yasuhiro Watari, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/887,090

(22) Filed: Sep. 17, 2024

(65) Prior Publication Data

US 2025/0004284 A1      Jan. 2, 2025

Related U.S. Application Data

(63) Continuation of application No. 18/452,819, filed on Aug. 21, 2023, now Pat. No. 12,124,044, which is a
(Continued)

(30) Foreign Application Priority Data

Dec. 2, 2015      (JP) ................................. 2015-235897

(51) Int. Cl.
G02B 27/01          (2006.01)
G06F 3/01          (2006.01)
(Continued)

(52) U.S. Cl.
CPC ....... G02B 27/0179 (2013.01); G02B 27/017 (2013.01); G06F 3/01 (2013.01);
(Continued)

(58) Field of Classification Search
CPC .............. G02B 27/0179; G02B 27/017; G02B 2027/0187; G06F 3/01; G06F 3/012;
(Continued)

(56) References Cited

U.S. PATENT DOCUMENTS 5,742,264 A * 4/1998 Inagaki .................. G09G 5/397
                                                                       348/E5.145
5,907,328 A * 5/1999 Brush, II ............ G06F 3/04815
                                                                       345/473
(Continued)

FOREIGN PATENT DOCUMENTS

CN          1409218 A      4/2003
CN          1529880 A      9/2004
(Continued)

OTHER PUBLICATIONS

International Search Report for corresponding PCT Application No. PCT/JP2016/084937, 3 pages, dated Feb. 28, 2017.
(Continued)

*Primary Examiner* — Amy Onyekaba
(74) *Attorney, Agent, or Firm* — Kilpatrick Townsend & Stockton LLP

(57)          ABSTRACT

Methods and apparatus provide for: generating a virtual space image by specifying a viewpoint position and a direction of line of sight and display the image on a head-mounted display, specifying a plurality of positions in the virtual space as viewpoint positions, changing the viewpoint position to a position determined from among the plurality of positions in accordance with an operation by a user, specifying a direction of line of sight, when the viewpoint position is changed, and displaying an image based on a same virtual three-dimensional space on the head mounted display and a display device other than the head mounted display.

20 Claims, 13 Drawing Sheets

Related U.S. Application Data continuation of application No. 17/225,203, filed on Apr. 8, 2021, now Pat. No. 11,768,383, which is a continuation of application No. 15/773,409, filed as application No. PCT/JP2016/084937 on Nov. 25, 2016, now Pat. No. 11,042,038.

(51) Int. Cl.

| | |
|---|---|
| *G06F 3/0346* | (2013.01) |
| *G06F 3/038* | (2013.01) |
| *G06F 3/0484* | (2022.01) |
| *G06F 3/0485* | (2022.01) |
| *G09G 5/00* | (2006.01) |
| *H04N 5/64* | (2006.01) |

(52) U.S. Cl.

CPC .............. *G06F 3/012* (2013.01); *G06F 3/013* (2013.01); *G06F 3/0346* (2013.01); *G06F 3/038* (2013.01); *G06F 3/0484* (2013.01); *G06F 3/0485* (2013.01); *G09G 5/00* (2013.01); *H04N 5/64* (2013.01); *G02B 2027/0187* (2013.01)

(58) Field of Classification Search

CPC ........ G06F 3/013; G06F 3/0346; G06F 3/038; G06F 3/0484; G06F 3/0485; G06F 3/147; G06F 3/011; G06F 3/04815; G09G 5/00; G09G 3/3406; G09G 2320/064; G09G 2354/00; G09G 2370/16; H04N 5/64; A63F 13/213; A63F 13/25; A63F 13/5252; A63F 13/5255; G06T 15/20; G06T 19/003

USPC ........................................................ 345/2.2

See application file for complete search history.

(56) References Cited

U.S. PATENT DOCUMENTS

| | | | | |
|---|---|---|---|---|
| 5,993,318 | A * | 11/1999 | Kousaki .............. | A63F 13/5255 434/69 |
| 6,124,843 | A * | 9/2000 | Kodama .............. | G02B 27/017 345/157 |
| 6,831,656 | B2 * | 12/2004 | Kitao ...................... | G06T 15/04 345/428 |
| 7,298,384 | B2 * | 11/2007 | Anabuki .............. | G02B 27/017 345/619 |
| 7,479,967 | B2 * | 1/2009 | Bachelder ............ | G06T 19/003 345/592 |
| 7,492,362 | B2 | 2/2009 | Sakagawa | |
| 7,646,394 | B1 * | 1/2010 | Neely, III ............... | G06F 3/011 715/863 |
| 8,108,190 | B2 | 1/2012 | Riener | |
| 8,564,645 | B2 | 10/2013 | Suzuki | |
| 8,879,787 | B2 | 11/2014 | Ikenoue | |
| 9,075,514 | B1 * | 7/2015 | Karakotsios ........ | G06F 3/04842 |
| 9,081,177 | B2 | 7/2015 | Wong | |
| 9,250,799 | B2 | 2/2016 | Okura | |
| 9,256,284 | B2 | 2/2016 | Hanaya | |
| 9,268,138 | B2 | 2/2016 | Shimizu | |
| 9,380,287 | B2 | 6/2016 | Nistico | |
| 9,448,625 | B2 | 9/2016 | Kobayashi | |
| 9,607,439 | B2 | 3/2017 | Uematsu | |
| 9,658,737 | B2 | 5/2017 | Rothenberger | |
| 9,684,169 | B2 | 6/2017 | Tanaka | |
| 9,740,009 | B2 | 8/2017 | Fujimaki | |
| 9,846,303 | B2 | 12/2017 | Biwa | |
| 9,928,650 | B2 | 3/2018 | Inomata | |
| 10,029,176 | B2 | 7/2018 | Aizawa | |
| 10,116,914 | B2 * | 10/2018 | Woods ................. | H04N 13/378 |
| 10,261,581 | B2 * | 4/2019 | Kim ........................ | G06F 3/013 |
| 11,042,038 | B2 | 6/2021 | Kake | |

| | | | | |
|---|---|---|---|---|
| 2002/0024521 | A1 * | 2/2002 | Goden .................... | A63F 13/52 345/474 |
| 2003/0017872 | A1 * | 1/2003 | Oishi ..................... | A63F 13/213 463/2 |
| 2004/0254771 | A1 * | 12/2004 | Riener ................... | G09B 23/32 703/7 |
| 2005/0024388 | A1 * | 2/2005 | Takemoto ............. | G06T 19/006 345/633 |
| 2005/0270309 | A1 * | 12/2005 | Murata ................. | A63F 13/525 345/632 |
| 2007/0109296 | A1 | 5/2007 | Sakagawa | |
| 2007/0252833 | A1 * | 11/2007 | Kuroki .................... | G06T 15/20 345/427 |
| 2007/0258658 | A1 | 11/2007 | Kobayashi | |
| 2008/0024392 | A1 | 1/2008 | Gustafsson | |
| 2008/0132334 | A1 * | 6/2008 | Nonaka ................. | A63F 13/428 463/43 |
| 2008/0297437 | A1 * | 12/2008 | Takahashi ............ | G02B 27/017 345/8 |
| 2009/0069096 | A1 * | 3/2009 | Nishimoto .............. | A63F 13/42 463/43 |
| 2010/0026714 | A1 * | 2/2010 | Utagawa .............. | G02B 27/017 345/633 |
| 2010/0066734 | A1 * | 3/2010 | Ohta ........................ | G06T 15/30 345/419 |
| 2010/0087258 | A1 * | 4/2010 | Moriwaki ............. | A63F 13/814 463/43 |
| 2010/0182409 | A1 | 7/2010 | Suzuki | |
| 2010/0289878 | A1 | 11/2010 | Sato | |
| 2011/0014977 | A1 * | 1/2011 | Yamazaki ............... | G06T 15/20 463/43 |
| 2011/0034300 | A1 * | 2/2011 | Hall ................... | A63B 24/0003 482/29 |
| 2011/0140994 | A1 * | 6/2011 | Noma ..................... | G06F 3/011 345/8 |
| 2011/0245942 | A1 * | 10/2011 | Yamamoto ............ | A63F 13/803 700/91 |
| 2012/0039507 | A1 * | 2/2012 | Ikenoue ................. | G06T 7/251 382/103 |
| 2012/0127284 | A1 * | 5/2012 | Bar-Zeev .............. | G06T 19/006 348/158 |
| 2012/0169725 | A1 * | 7/2012 | Shimizu ............. | G02B 27/0172 345/419 |
| 2012/0212429 | A1 | 8/2012 | Okura | |
| 2013/0009957 | A1 | 1/2013 | Arakita | |
| 2013/0194305 | A1 * | 8/2013 | Kakuta .................... | G06F 3/147 345/633 |
| 2013/0258461 | A1 * | 10/2013 | Sato ........................ | G02B 27/01 359/464 |
| 2013/0293530 | A1 * | 11/2013 | Perez ................. | G06Q 30/0251 345/418 |
| 2014/0002329 | A1 * | 1/2014 | Nishimaki .......... | G06F 3/04815 345/8 |
| 2014/0125785 | A1 * | 5/2014 | Na ........................ | H04N 13/341 348/56 |
| 2014/0160129 | A1 | 6/2014 | Sako | |
| 2014/0186002 | A1 * | 7/2014 | Hanaya ................. | G06F 3/011 386/200 |
| 2014/0198033 | A1 * | 7/2014 | Kobayashi ........... | G02B 27/017 345/156 |
| 2014/0225920 | A1 * | 8/2014 | Murata ................. | G02B 27/017 345/633 |
| 2014/0241586 | A1 * | 8/2014 | Miyamoto ............. | G06V 20/20 382/106 |
| 2014/0327613 | A1 * | 11/2014 | Chessa ................... | G06T 15/08 345/156 |
| 2014/0354515 | A1 * | 12/2014 | LaValle .............. | G02B 27/0093 345/8 |
| 2014/0361956 | A1 * | 12/2014 | Mikhailov ......... | G02B 27/0179 345/8 |
| 2014/0362446 | A1 * | 12/2014 | Bickerstaff ........ | G02B 27/0093 359/630 |
| 2014/0375560 | A1 * | 12/2014 | Masuda .............. | G06F 3/04815 345/157 |
| 2014/0375687 | A1 * | 12/2014 | Tanaka ................. | G06T 19/006 345/633 |

(56) References Cited

U.S. PATENT DOCUMENTS

| | | | | |
|---|---|---|---|---|
| 2015/0009101 | A1* | 1/2015 | Biwa | G02B 27/017 345/8 |
| 2015/0022664 | A1* | 1/2015 | Pflug | G06F 3/04883 348/148 |
| 2015/0049003 | A1 | 2/2015 | Fujimaki | |
| 2015/0049018 | A1* | 2/2015 | Gomez | G02B 27/017 345/156 |
| 2015/0052458 | A1 | 2/2015 | Rothenberger | |
| 2015/0177829 | A1* | 6/2015 | Sakuta | G06F 3/0346 345/156 |
| 2015/0199850 | A1* | 7/2015 | Uematsu | G06T 15/20 345/633 |
| 2015/0288944 | A1* | 10/2015 | Nistico | G06F 3/0487 345/156 |
| 2015/0293362 | A1* | 10/2015 | Takahashi | H04N 13/296 348/47 |
| 2015/0352437 | A1* | 12/2015 | Koseki | A63F 13/5255 463/31 |
| 2016/0078681 | A1* | 3/2016 | Shikoda | G06T 7/73 345/633 |
| 2016/0078682 | A1* | 3/2016 | Shikoda | G06T 19/006 345/633 |
| 2016/0125654 | A1* | 5/2016 | Shikoda | G02B 27/0101 345/633 |
| 2016/0162248 | A1* | 6/2016 | Bassett | G02B 27/017 345/2.2 |
| 2016/0282619 | A1* | 9/2016 | Oto | A63F 13/25 |
| 2016/0287994 | A1* | 10/2016 | Tamaoki | A63F 13/80 |
| 2016/0330376 | A1* | 11/2016 | Debevec | F16M 11/2064 |
| 2017/0076486 | A1* | 3/2017 | Aizawa | G06F 1/163 |
| 2017/0076497 | A1* | 3/2017 | Inomata | G06T 19/006 |
| 2017/0076503 | A1* | 3/2017 | Tamaoki | G06F 3/017 |
| 2017/0153713 | A1* | 6/2017 | Niinuma | G06V 40/113 |
| 2017/0169540 | A1* | 6/2017 | Satori | H04N 21/4728 |
| 2017/0278262 | A1 | 9/2017 | Kawamoto | |
| 2018/0307310 | A1* | 10/2018 | McCombe | G06F 3/04815 |
| 2018/0321493 | A1* | 11/2018 | Kim | G02B 27/017 |
| 2018/0329215 | A1 | 11/2018 | Kake | |
| 2018/0349083 | A1 | 12/2018 | Kasahara | |
| 2019/0121515 | A1 | 4/2019 | Nashida | |

FOREIGN PATENT DOCUMENTS

| | | | |
|---|---|---|---|
| CN | 1708982 | A | 12/2005 |
| CN | 101123692 | A | 2/2008 |
| CN | 101414383 | A | 4/2009 |
| CN | 101783967 | A | 7/2010 |
| CN | 101970067 | A | 2/2011 |
| CN | 102317888 | A | 1/2012 |
| CN | 102317892 | A | 1/2012 |
| CN | 102566052 | A | 7/2012 |
| CN | 104238665 | A | 12/2014 |
| CN | 104280882 | A | 1/2015 |
| CN | 104376194 | | 2/2015 |
| CN | 104407700 | A | 3/2015 |
| CN | 104423041 | A | 3/2015 |
| CN | 104603673 | A | 5/2015 |
| CN | 104794757 | A | 7/2015 |
| CN | 108292490 | A | 7/2018 |
| CN | 102860837 | A | 1/2019 |
| JP | 08202281 | A | 8/1996 |
| JP | 2000020753 | A | 1/2000 |
| JP | 2000250699 | A | 9/2000 |
| JP | 2002170132 | A | 6/2002 |
| JP | 2002263371 | A | 9/2002 |
| JP | 2004054590 | A | 2/2004 |
| JP | 2004283521 | A | 10/2004 |
| JP | 2005174021 | A | 6/2005 |
| JP | 2006061716 | A | 3/2006 |
| JP | 2007299326 | A | 11/2007 |
| JP | 2007312930 | A | 12/2007 |
| JP | 2012008745 | A | 1/2012 |
| JP | 2012048597 | A | 3/2012 |
| JP | 2014127987 | A | 7/2014 |
| JP | 2014137396 | A | 7/2014 |
| JP | 2015011368 | A | 1/2015 |
| JP | 2015095045 | A | 5/2015 |
| JP | 2015182712 | A | 10/2015 |
| JP | 2015187797 | A | 10/2015 |
| JP | 5869177 | B1 | 2/2016 |

OTHER PUBLICATIONS

International Preliminary Report on Patentability and Written Opinion for corresponding PCT Application No. PCT/JP2016/084937, 10 pages, dated Jul. 6, 2018.
Partial Supplementary European Search Report for corresponding EP Application No. 16870544.0, 15 pages, dated Oct. 16, 2018.
Extended European Search Report for corresponding EP Application No. 18206819, 8 pages, dated Mar. 14, 2019.
Examination Report for corresponding EP Application No. 16870544.0, 5 pages, dated Feb. 25, 2020.
Examination Report for corresponding EP Application No. 18206819.7, 7 pages, dated Feb. 25, 2020.
Caroline Jay et al: "Amplifying Head Movements with Head-Mounted Displays", Presence, vol. 12, No. 3, pp. 268-276, Jun. 1, 2003.
The First Office Action for corresponding CN Application No. 201680069099.8, 22 pages, dated Jul. 3, 2020.
Notice of Reasons for Refusal for corresponding JP Application No. 2020055471, 6 pages, dated Feb. 4, 2021.
The Second Office Action for corresponding CN Application No. 201680069099.8, 17 pages, dated Mar. 25, 2021.
Notification of Decision to Grant corresponding CN Application No. 201680069099.8, 8 pages, dated Sep. 30, 2021.
Extended European Search Report for corresponding EP Application No. 21208486.7, 8 pages, dated Feb. 17, 2022.
Notification of Reasons for Refusal for corresponding JP Application No. 2021-088448, 4 pages, dated Apr. 6, 2022.
Reconsideration Report before Appeal for corresponding JP Application No. 2021-088448, 4 pages, dated Dec. 16, 2022.
Notice of Reasons for Refusal for corresponding JP Application No. 2021-88448, 16 pages, dated Aug. 30, 2023.
Sato "The 13th time of VR Gaming Today! series Playstation VR, TGS2015 exhibition title was tried! Precious opportunity. A title to be played by a game fan on a general date!", Game Watch, 12 pages, Sep. 18, 2015.
PlayStation.Blog, "PlayStation "R" VR is jumping to the world of the game!" 9 pages, Nov. 24, 2015.
Decision of "the official name of the Sony's retractable VR headset System is," PlayStation VR ProNews, 4 pages, Sep. 18, 2015.
Notification of Fulfilling of Registration Formality for corresponding CN Application No. 202111534076.9, 10 pages, dated Jul. 9, 2024.

* cited by examiner

100

20

20

F I G . 5
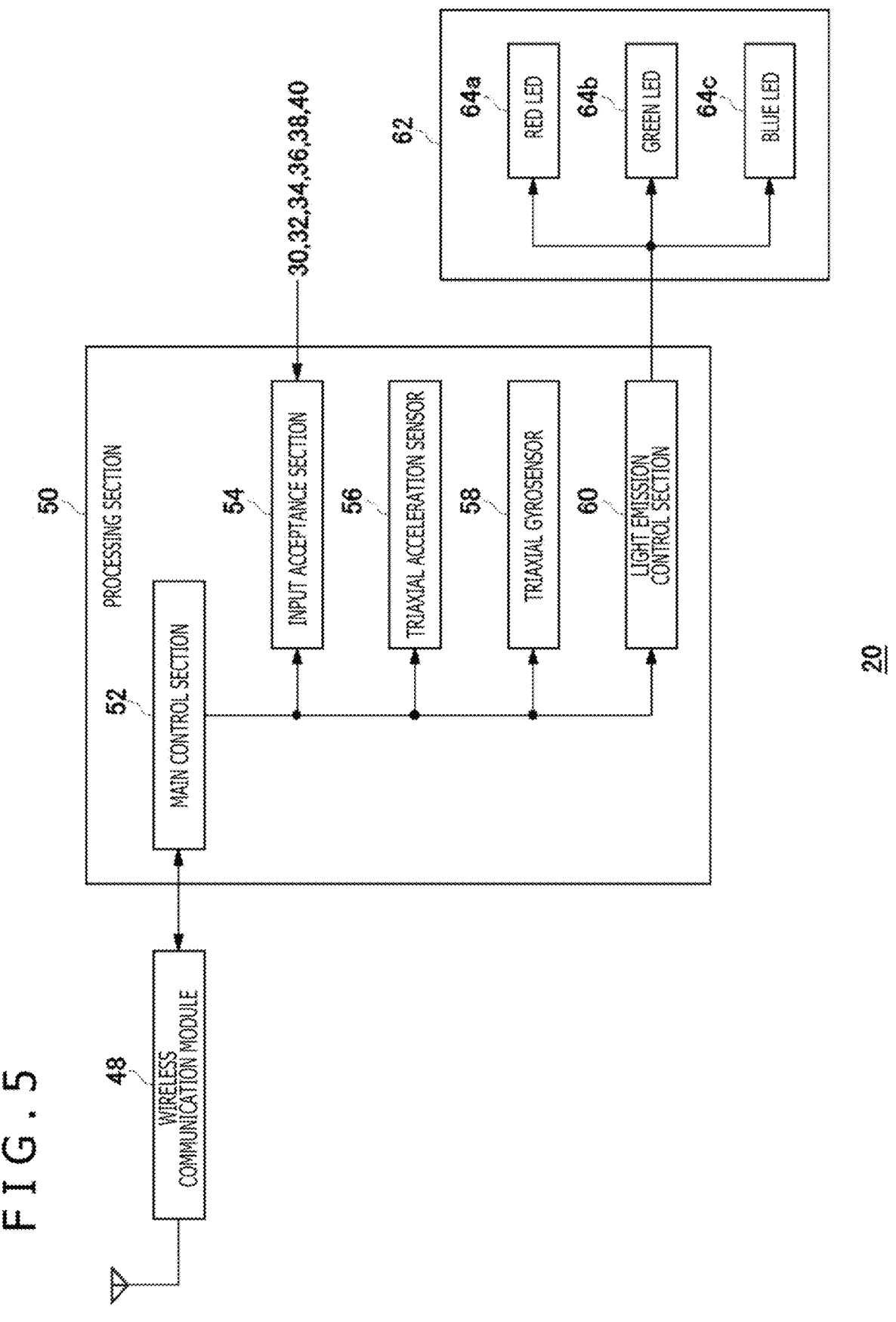

300

F I G . 8A
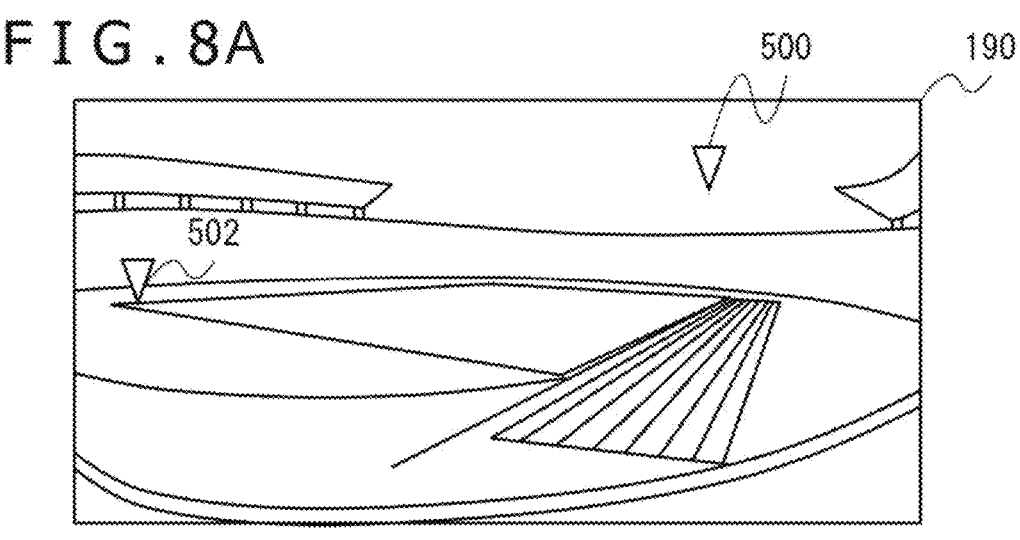

F I G . 1 2 A
190
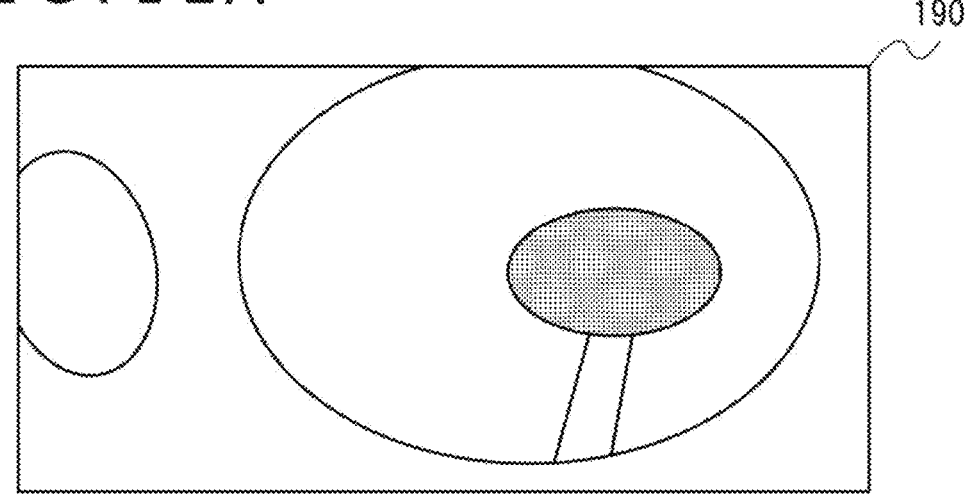
FIG. 12B
190
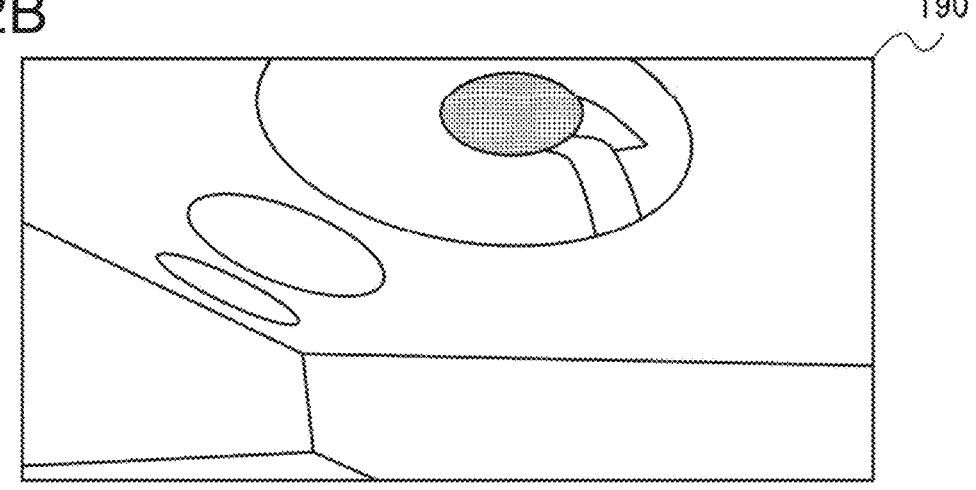
FIG. 12C
190
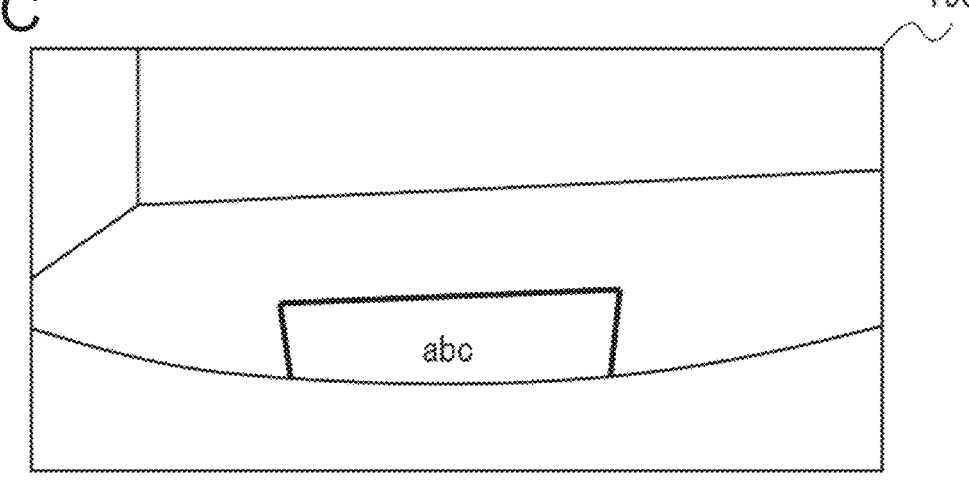

DISPLAY CONTROL APPARATUS AND DISPLAY CONTROL METHOD

CROSS REFERENCE TO RELATED APPLICATIONS

This is a continuation application of U.S. patent application Ser. No. 18/452,819, accorded a filing date of Aug. 21, 2023, allowed; which is a continuation application of U.S. patent application Ser. No. 17/225,203, accorded a filing date of Apr. 8, 2021 (U.S. Pat. No. 11,768,383, issued Sep. 26, 2023); which is a continuation application of U.S. patent application Ser. No. 15/773,409, accorded a filing date of May 3, 2018 (U.S. Pat. No. 11,042,038, issued Jun. 22, 2021); which is a national stage application of International Application No. PCT/JP2016/084937, filed Nov. 25, 2016; and which claims priority to JP Application No. 2015-235897, filed Dec. 2, 2015, the entire disclosures of which are hereby incorporated by reference.

TECHNICAL FIELD

The present invention relates to a display control technology, and more particularly, to a display control apparatus and a display control method for controlling display on a head-mounted display.

BACKGROUND ART

Games are played by wearing a head-mounted display, connected to a game console, on the head, watching a screen displayed on the head-mounted display, and manipulating a controller or other device. With an ordinary stationary display, a user's field-of-view range spreads outside the display screen, possibly making it impossible to focus one's attention on the display screen or resulting in insufficient sense of immersion. In that respect, when a head-mounted display is worn, a user cannot see anything other than an image appearing on the head-mounted display, thereby increasing a sense of immersion into the image world and further enhancing the entertaining nature of the game.

SUMMARY

Technical Problem

The inventor recognized the need for a more convenient display control technology to ensure that games using a head-mounted display can be enjoyed by more user segments.

Solution to Problem

In order to solve the above problem, a display control apparatus according to a mode of the present invention includes a display control section that generates a virtual space image by specifying a viewpoint position and a direction of line of sight and displays the image on a head-mounted display. The display control section can specify a plurality of positions in the virtual space as viewpoint positions and can change the viewpoint position to a position determined from among the plurality of positions in accordance with an attitude of the head-mounted display, and when the viewpoint position is changed, the display control section specifies, as a direction of line of sight, the direction in which a first position in the virtual space is seen from the changed viewpoint position.

Another mode of the present invention is a display control apparatus. This apparatus includes a display control section and a viewpoint position control section. The display control section generates a virtual space image by specifying a viewpoint position and a direction of line of sight and displays the image on a head-mounted display. The viewpoint position control section moves the viewpoint position in accordance with a position of the head-mounted display. The viewpoint position control section moves the viewpoint position to a greater extent when the head-mounted display is moved horizontally than when the head-mounted display is moved perpendicularly.

It should be noted that arbitrary combinations of the above components and conversions of expressions of the present invention between method, apparatus, system, program, and so on are also effective as modes of the present invention.

Advantageous Effect of Invention

According to the present invention, it is possible to improve convenience of head-mounted display users.

BRIEF DESCRIPTION OF DRAWINGS

FIG. 5 is a diagram illustrating an internal configuration of the input apparatus.

FIGS. 12($a$) to 12($c$) are diagrams illustrating examples of images displayed on the head-mounted display.

DESCRIPTION OF EMBODIMENT

In the present embodiment, a description will be given of a display technology using a head-mounted display (HMD). A head-mounted display is a display apparatus worn on a user's head in such a manner as to cover his or her eyes so that the user can view still images and videos appearing on a display screen provided in front of user's eyes. What appears on the head-mounted display may be content such as movies and television (TV) programs. In the present embodiment, however, a description will be given of an example in which a head-mounted display is used as a display apparatus for displaying game images.

Figure 1:
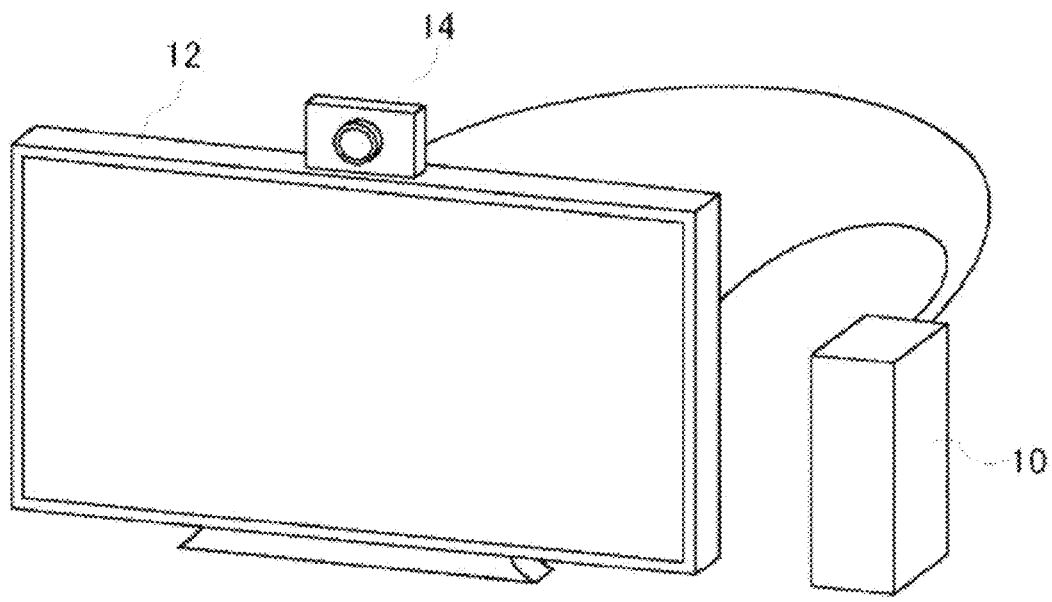
FIG. 1 is a diagram illustrating an environment in which a game system according to an embodiment is used.
Figure 1:
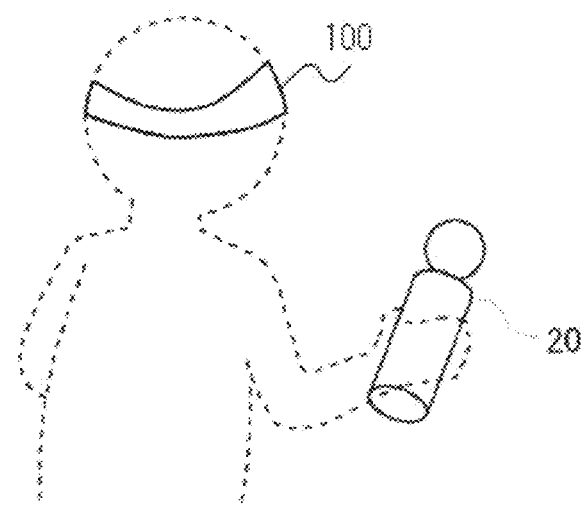

FIG. 1 is a diagram illustrating an environment in which a game system 1 according to an embodiment is used. The game system 1 includes a gaming apparatus 10, an input apparatus 20, an imaging apparatus 14, a head-mounted display 100, and a display apparatus 12. The gaming apparatus 10 executes a game program. The input apparatus 20 is used to input a user instruction to the gaming apparatus 10. The imaging apparatus 14 images a real space around a user. The head-mounted display 100 displays a first game image generated by the gaming apparatus 10. The display apparatus 12 displays a second game image generated by the gaming apparatus 10.

The gaming apparatus 10 executes a game program based on an instruction input supplied from the input apparatus 20 or the head-mounted display 100, a position or attitude of the input apparatus 20 or the head-mounted display 100, and so on, generates a first game image and transports the image to the head-mounted display 100, and generates a second game image and transports the image to the display apparatus 12.

The head-mounted display 100 displays the first game image generated by the gaming apparatus 10. The head-mounted display 100 also transports, to the gaming apparatus 10, information related to user input to the input apparatus provided on the head-mounted display 100. The head-mounted display 100 may be connected to the gaming apparatus 10 with a wired cable. Alternatively, the head-mounted display 100 may be connected wirelessly through wireless local area network (LAN) or other means.

The display apparatus 12 displays a second game image generated by the gaming apparatus 10. The display apparatus 12 may be a TV having a display and a speaker. Alternatively, the display apparatus 12 may be a computer display or other apparatus.

The input apparatus 20 has a function to transport user instruction input to the gaming apparatus 10 and is configured as a wireless controller capable of wirelessly communicating with the gaming apparatus 10 in the present embodiment. The input apparatus 20 and the gaming apparatus 10 may establish wireless connection using Bluetooth (registered trademark) protocol. It should be noted that the input apparatus 20 is not limited to a wireless controller and may be a wired controller connected to the gaming apparatus 10 via a cable.

The input apparatus 20 is driven by batteries and is configured to have a plurality of buttons for making instruction input so as to progress the game. When the user operates a button on the input apparatus 20, instruction input resulting from the operation is sent to the gaming apparatus 10 through wireless communication.

The imaging apparatus 14 is a video camera that includes, for example, a charge-coupled device (CCD) imaging device or a complementary metal-oxide semiconductor (CMOS) imaging device and generates, by imaging a real space at a given interval, a frame image for each interval. The imaging apparatus 14 is connected to the gaming apparatus 10 via a universal serial bus (USB) or other interface. An image captured by the imaging apparatus 14 is used by the gaming apparatus 10 to derive the positions and attitudes of the input apparatus 20 and the head-mounted display 100. The imaging apparatus 14 may be a ranging camera or a stereo camera capable of acquiring a distance. In this case, the imaging apparatus 14 makes it possible to acquire the distance between the imaging apparatus 14 and the input apparatus 20 or the head-mounted display 100.

In the game system 1 of the present embodiment, the input apparatus 20 and the head-mounted display 100 have a light-emitting section configured to emit light in a plurality of colors. During a game, the light-emitting section emits light in the color specified by the gaming apparatus 10 and is imaged by the imaging apparatus 14. The imaging apparatus 14 images the input apparatus 20, generates a frame image, and supplies the image to the gaming apparatus 10. The gaming apparatus 10 acquires the frame image and derives position information of the light-emitting section in the real space from the position and size of the image of the light-emitting section in the frame image. The gaming apparatus 10 treats position information as a game operation instruction and reflects position information in game processing including controlling the action of a player's character.

Also, the input apparatus 20 and the head-mounted display 100 have an acceleration sensor and a gyrosensor. Sensor detection values are sent to the gaming apparatus 10 at a given interval, and the gaming apparatus 10 acquires sensor detection values and acquires attitude information of the input apparatus 20 and the head-mounted display 100 in the real space. The gaming apparatus 10 treats attitude information as a game operation instruction and reflects attitude information in game processing.

Figure 2:
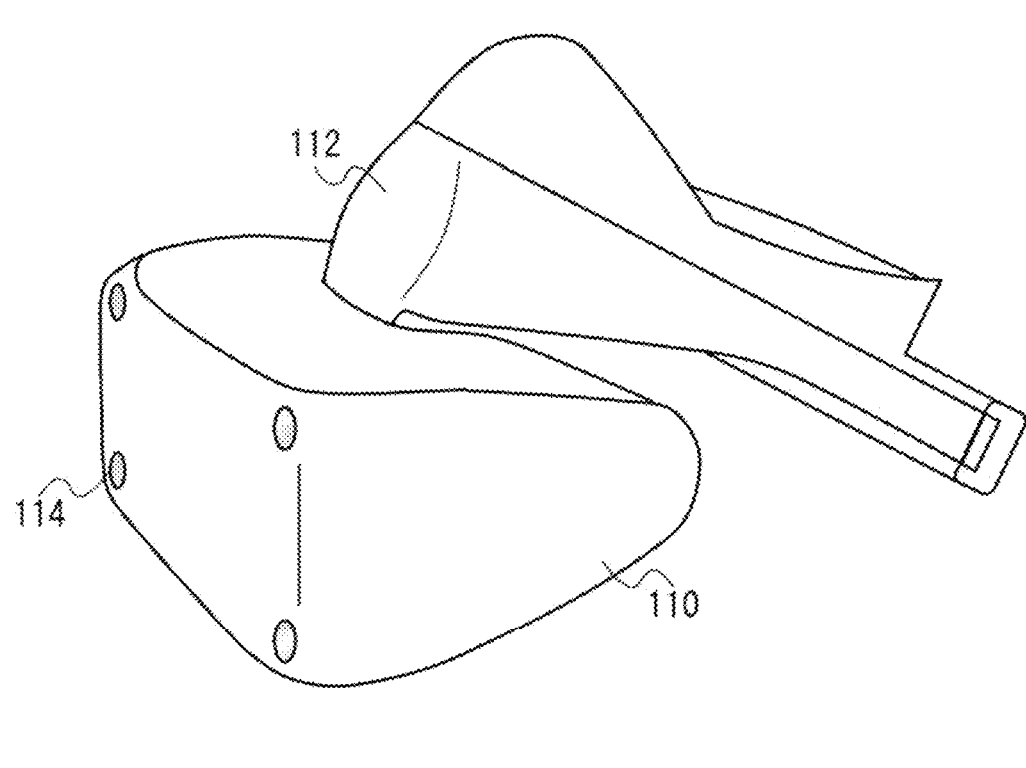
FIG. 2 is an external view of a head-mounted display according to the embodiment.

FIG. 2 is an external view of the head-mounted display 100 according to the embodiment. The head-mounted display 100 includes a main body section 110, a head contact section 112, and a light-emitting section 114.

The main body section 110 includes a display, a global positioning system (GPS) unit for acquiring position information, an attitude sensor, a communication apparatus, and so on. The head contact section 112 may include a biological information acquisition sensor capable of measuring user's biological information such as temperature, pulse, blood components, perspiration, brain waves, and cerebral blood flow. As described above, the light-emitting section 114 emits light in the color specified by the gaming apparatus 10 and functions as a criterion for calculating the position of the head-mounted display 100 in the image captured by the imaging apparatus 14.

A camera for capturing the user's eyes may be further provided on the head-mounted display 100. The camera mounted to the head-mounted display 100 permits detection of the user's line of sight, movement of the pupils, blinking, and so on.

Although a description will be given of the head-mounted display 100 in the present embodiment, the display control technology of the present embodiment is applicable not only to a case in which the head-mounted display 100 in a narrow sense is worn but also to a case in which eyeglasses, an eyeglass-type display, an eyeglass-type camera, a headphone, a headset (microphone equipped headphone), an earphone, an earring, an ear-mounted camera, a hat, a camera-equipped hat, or hair band is worn.

Figure 3:
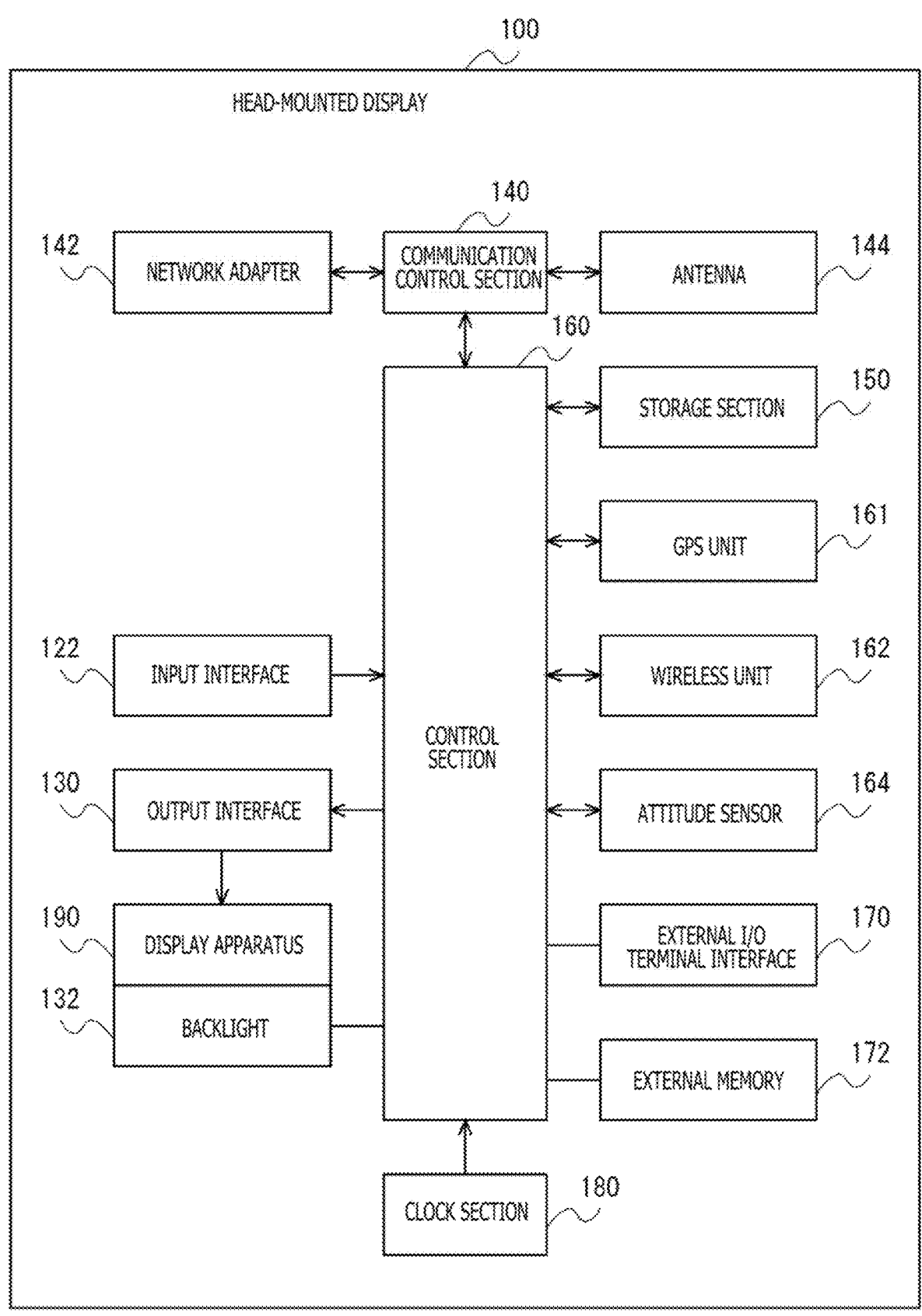
FIG. 3 is a functional configuration diagram of the head-mounted display.

FIG. 3 is a functional configuration diagram of the head-mounted display 100. The head-mounted display 100 includes an input interface 122, an output interface 130, a backlight 132, a communication control section 140, a network adapter 142, an antenna 144, a storage section 150, a GPS unit 161, a wireless unit 162, an attitude sensor 164, an external input/output (I/O) terminal interface 170, an external memory 172, a clock section 180, a display apparatus 190, and a control section 160. These functional blocks can also be realized by hardware alone, software alone, or a combination thereof in various forms.

The control section 160 is a main processor that processes and outputs signals such as image signals and sensor signals, instructions, and data. The input interface 122 accepts an operation signal and a setup signal from input buttons and so on and supplies these signals to the control section 160. The output interface 130 receives an image signal from the control section 160 and displays the signal on the display apparatus 190. The backlight 132 supplies backlight to a liquid crystal display making up the display apparatus 190.

The communication control section 140 sends, to external equipment, data input from the control section 160 in a wired or wireless communication manner via the network adapter 142 or the antenna 144. The communication control section 140 receives data from external equipment in a wired or wireless manner via the network adapter 142 or the antenna 144 and outputs the data to the control section 160.

The storage section 150 temporarily stores data and parameters processed by the control section 160, operation signals, and so on.

The GPS unit 161 receives position information from a GPS satellite in accordance with an operation signal from the control section 160 and supplies position information to the control section 160. The wireless unit 162 receives position information from a wireless base station in accordance with an operation signal from the control section 160 and supplies position information to the control section 160.

The attitude sensor 164 detects attitude information such as orientation and tilt of the main body section 110 of the head-mounted display 100. The attitude sensor 164 is realized by combining a gyrosensor, an acceleration sensor, an angular acceleration sensor, and so on as appropriate.

The external I/O terminal interface 170 is an interface for connecting peripheral equipment such as USB controller. The external memory 172 is an external memory such as flash memory.

The clock section 180 specifies time information using a setup signal from the control section 160 and supplies time information to the control section 160.

Figure 4A:
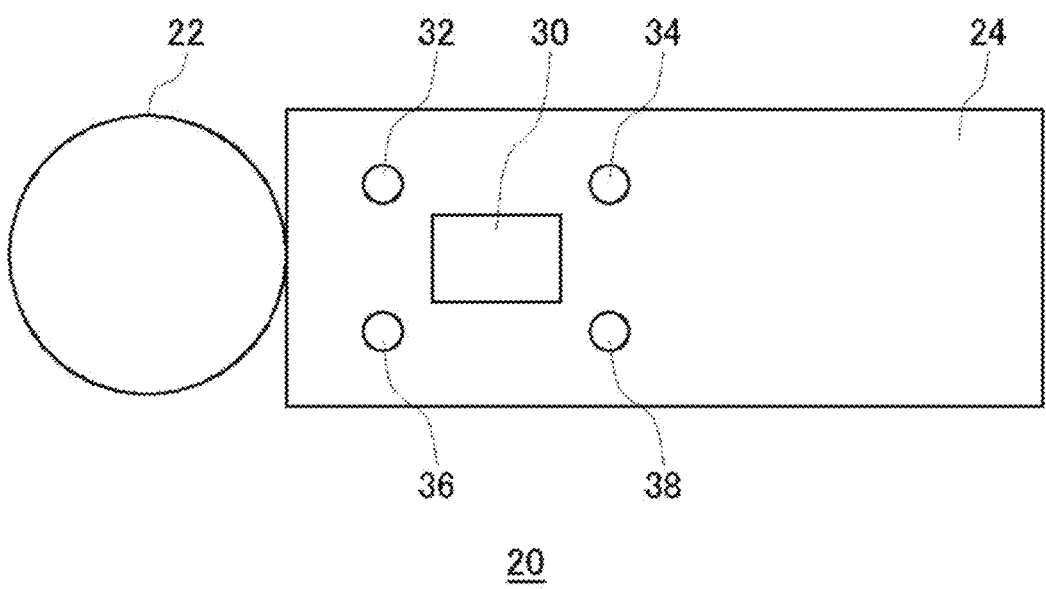
FIG. 4($a$) and FIG. 4($b$) depict diagrams illustrating an external configuration of an input apparatus.
Figure 4B:
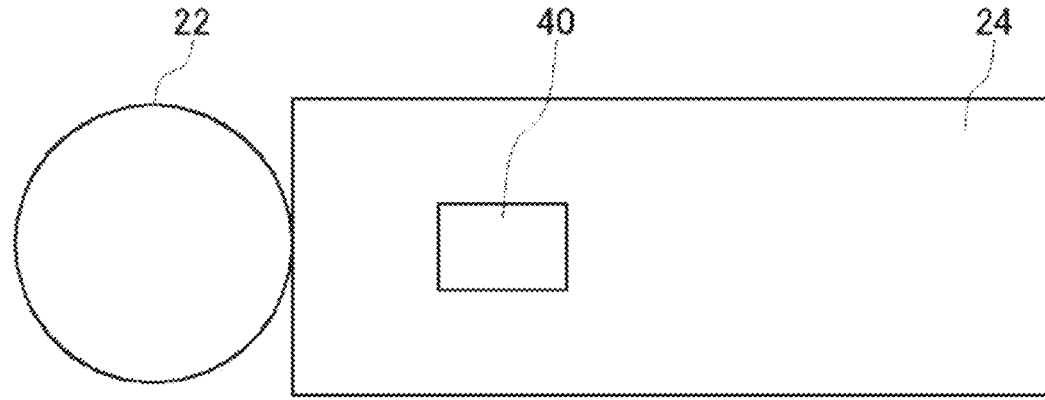

FIG. 4 illustrates an external configuration of the input apparatus 20, and FIG. 4(*a*) illustrates a top surface configuration of the input apparatus 20, and FIG. 4(*b*) illustrates a bottom surface configuration of the input apparatus 20. The input apparatus 20 has a light-emitting body 22 and a handle 24. The light-emitting body 22 has an outside light-emitting device made of a light-transmitting resin formed in a spherical shape and a light-emitting diode or an electric bulb therein. When the light-emitting device therein emits light, the entire outside spherical body shines. Operating buttons 30, 32, 34, 36, and 38 are provided on the top surface of the handle 24, and an operating button 40 is provided on the bottom surface thereof. The user operates the operating buttons 30, 32, 34, 36, and 38 with the thumb and the operating button 40 with the index finger while holding an end portion of the handle 24 with the hand. The operating buttons 30, 32, 34, 36, and 38 include pushbuttons and are operated as the user presses them. The operating button 40 may be a button that permits entry of an analog amount.

The user plays a game while watching a game screen displayed on the display apparatus 12. The imaging apparatus 14 needs to image the light-emitting body 22 during execution of a game application. Therefore, an imaging range thereof is preferably arranged to face the same direction as the display apparatus 12. In general, the user often plays games in front of the display apparatus 12. Therefore, the imaging apparatus 14 is arranged such that an optical axis thereof matches a front direction of the display apparatus 12. Specifically, the imaging apparatus 14 is preferably arranged near the display apparatus 12 such that the imaging range thereof includes a position where the user can visually recognize the display screen of the display apparatus 12. This allows the imaging apparatus 14 to image the input apparatus 20.

FIG. 5 illustrates an internal configuration of the input apparatus 20. The input apparatus 20 includes a wireless communication module 48, a processing section 50, a light-emitting section 62, and the operating buttons 30, 32, 34, 36, 38, and 40. The wireless communication module 48 has a function to send and receive data to and from a wireless communication module of the gaming apparatus 10. The processing section 50 performs predetermined processes in the input apparatus 20.

The processing section 50 includes a main control section 52, an input acceptance section 54, a triaxial acceleration sensor 56, a triaxial gyrosensor 58, and a light emission control section 60. The main control section 52 sends and receives necessary data to and from the wireless communication module 48.

The input acceptance section 54 accepts input information from the operating buttons 30, 32, 34, 36, 38, and 40 and sends input information to the main control section 52. The triaxial acceleration sensor 56 detects acceleration components of three axial directions of X, Y, and Z. The triaxial gyrosensor 58 detects angular speeds on XZ, ZY, and YX planes. It should be noted that, here, width, height, and length directions of the input apparatus 20 are specified as X, Y, and Z axes. The triaxial acceleration sensor 56 and the triaxial gyrosensor 58 are preferably arranged inside the handle 24 and near the center inside the handle 24. The wireless communication module 48 sends, together with input information from the operating buttons, detection value information obtained by the triaxial acceleration sensor 56 and detection value information obtained by the triaxial gyrosensor 58, to the wireless communication module of the gaming apparatus 10 at a given interval. This transmission interval is set, for example, at 11.25 milliseconds.

The light emission control section 60 controls light emission of the light-emitting section 62. The light-emitting section 62 has a red light-emitting diode (LED) 64a, a green LED 64b, and a blue LED 64c, thereby allowing them to emit light in a plurality of colors. The light emission control section 60 causes the light-emitting section 62 to emit light in a desired color by controlling light emission of the red LED 64a, the green LED 64b, and the blue LED 64c.

When a light emission instruction is received from the gaming apparatus 10, the wireless communication module 48 supplies the light emission instruction to the main control section 52. The main control section 52 supplies the light emission instruction to the light emission control section 60. The light emission control section 60 controls light emission of the red LED 64a, the green LED 64b, and the blue LED 64c such that the light-emitting section 62 emits light in the color specified by the light emission instruction. For example, the light emission control section 60 may control lighting of each LED through pulse width modulation (PWM) control.

Figure 6:
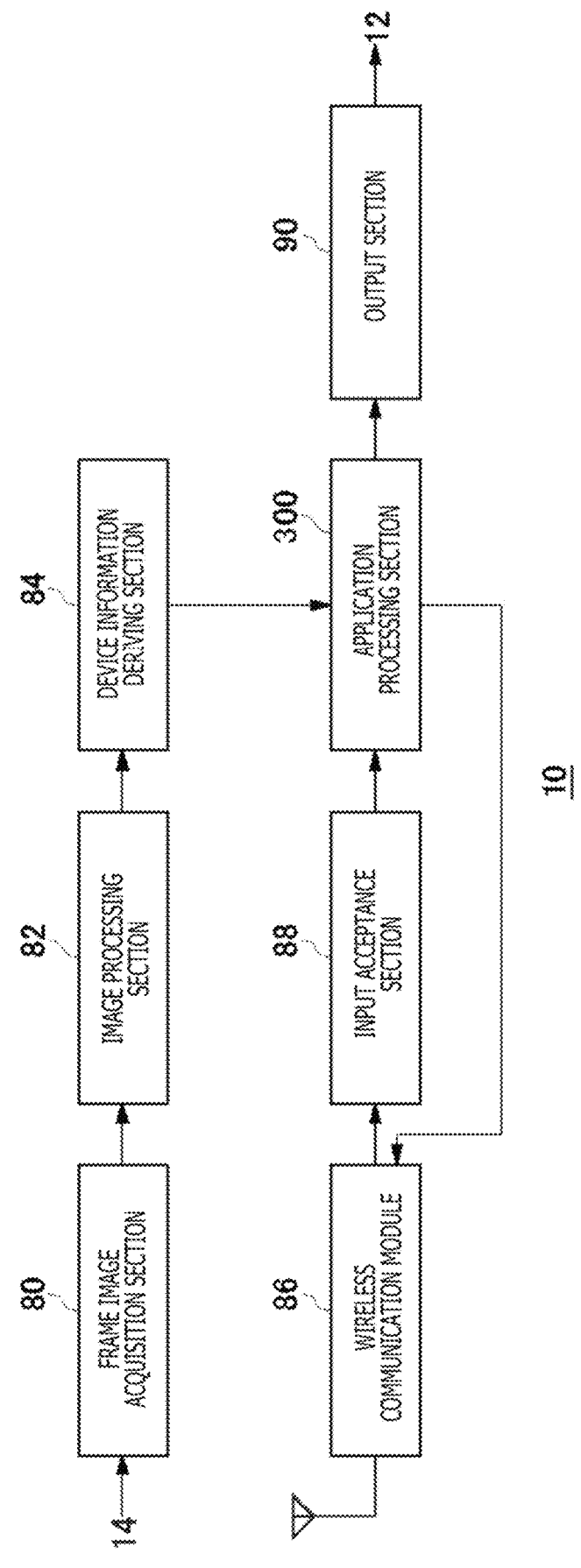
FIG. 6 is a diagram illustrating a configuration of a gaming apparatus.

FIG. 6 illustrates a configuration of the gaming apparatus 10. The gaming apparatus 10 includes a frame image acquisition section 80, an image processing section 82, a device information deriving section 84, a wireless communication module 86, an input acceptance section 88, an output section 90, and an application processing section 300. The processing capability of the gaming apparatus 10 in the present embodiment is realized by a central processing unit (CPU), a memory, and a program loaded into the memory, and so on. Here, a configuration is depicted that is realized by these components working with each other in a coordinated fashion. The program may be built into the gaming apparatus 10. Alternatively, the program may be externally supplied stored in a recording medium. Therefore, it is to be understood by those skilled in the art that these functional blocks can be realized in various ways by hardware alone, software alone, or a combination thereof. It should be noted that the gaming apparatus 10 may have a plurality of CPUs from a viewpoint of hardware configuration.

The wireless communication module 86 establishes wireless communication with the wireless communication module 48 of the input apparatus 20. This allows the input apparatus 20 to send operating button state information and detection value information of the triaxial acceleration sensor 56 and the triaxial gyrosensor 58 to the gaming apparatus 10 at a given interval.

The wireless communication module 86 receives operating button state information and sensor detection value information sent from the input apparatus 20 and supplies them to the input acceptance section 88. The input acceptance section 88 separates button state information and sensor detection value information and hands them over to the application processing section 300. The application processing section 300 receives button state information and sensor detection value information as a game operation instruction. The application processing section 300 treats sensor detection value information as attitude information of the input apparatus 20.

The frame image acquisition section 80 is configured as a USB interface and acquires frame images at a given imaging speed (e.g., 30 frames/second) from the imaging apparatus 14. The image processing section 82 extracts a light-emitting body image from a frame image. The image processing section 82 identifies the position and size of the light-emitting body in the frame images. For example, as the light-emitting body 22 of the input apparatus 20 emits light in a color that is unlikely used in the user's environment, the image processing section 82 can extract a light-emitting body image from a frame image with high accuracy. The image processing section 82 may generate a binarized image by binarizing frame image data using a given threshold. This binarization encodes a pixel value of a pixel having luminance higher than the given threshold as "1" and the pixel value of a pixel having luminance equal to or lower than the given threshold as "0." By causing the light-emitting body 22 to light up at luminance beyond this given threshold, the image processing section 82 can identify the position and size of the light-emitting body image from the binarized image. For example, the image processing section 82 identifies coordinates of a center of gravity and a radius of the light-emitting body image in the frame image.

The device information deriving section 84 derives position information of the input apparatus 20 and the head-mounted display 100 as seen from the imaging apparatus 14 from the position and size of the light-emitting body image identified by the image processing section 82. The device information deriving section 84 derives position coordinates in camera coordinates from the center of gravity of the light-emitting body image and also derives distance information from the imaging apparatus 14 from the radius of the light-emitting body image. The position coordinates and the distance information make up position information of the input apparatus 20 and the head-mounted display 100. The device information deriving section 84 derives position information of the input apparatus 20 and the head-mounted display 100 for each frame image and hands over position information to the application processing section 300. The application processing section 300 receives position information of the input apparatus 20 and the head-mounted display 100 as a game operation instruction.

The application processing section 300 progresses the game from position information and attitude information of the input apparatus 20 and button state information and generates an image signal indicating processing results of the game application. The image signal is sent to the display apparatus 12 from the output section 90 and output as a display image.

Figure 7:
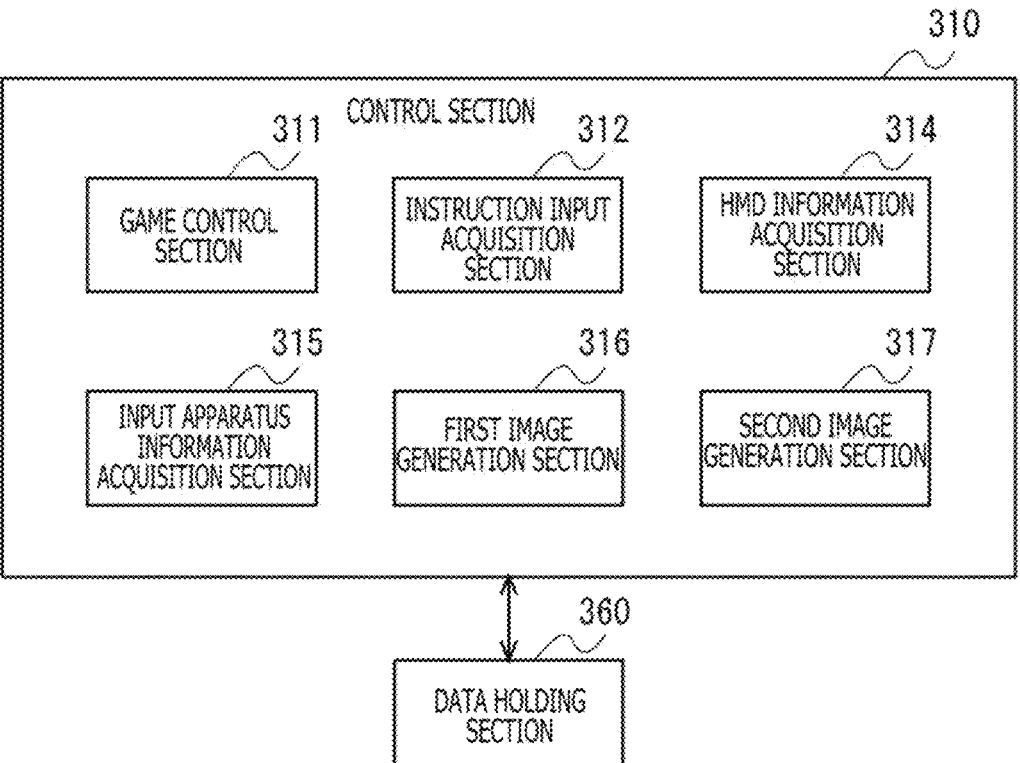
FIG. 7 is a functional configuration diagram of the gaming apparatus.

FIG. 7 is a functional configuration diagram of the gaming apparatus 10. The application processing section 300 of the gaming apparatus 10 includes a control section 310 and a data holding section 360. The control section 310 includes a game control section 311, an instruction input acquisition section 312, an HMD information acquisition section 314, an input apparatus information acquisition section 315, a first image generation section 316, and a second image generation section 317.

The data holding section 360 holds program data of games executed in the gaming apparatus 10, various data used by the game programs, and so on.

The instruction input acquisition section 312 acquires information related to user instruction input accepted by the input apparatus 20 or the head-mounted display 100 from the input apparatus 20 or the head-mounted display 100.

The HMD information acquisition section 314 acquires information related to the attitude of the head-mounted display from the head-mounted display 100. Also, the HMD information acquisition section 314 acquires information related to the position of the head-mounted display 100 from the device information deriving section 84. These pieces of information are conveyed to the game control section 311. Information related to the attitude of the head-mounted display 100 may be acquired by the device information deriving section 84 analyzing a captured image of the head-mounted display 100.

The input apparatus information acquisition section 315 acquires information related to the attitude of the input apparatus 20. Also, the input apparatus information acquisition section 315 acquires information related to the position of the input apparatus 20 from the device information deriving section 84. These pieces of information are conveyed to the game control section 311. Information related to the attitude of the input apparatus 20 may be acquired by the device information deriving section 84 analyzing a captured image of the input apparatus 20.

If the input apparatus 20 moves out of the imaging range of the imaging apparatus 14 or if the input apparatus 20 is hidden behind the user's body or an obstacle and fails to be imaged by the imaging apparatus 14, the input apparatus information acquisition section 315 calculates the position of the input apparatus 20 based on the previously acquired position of the input apparatus 20 and information related to the attitude of the input apparatus 20 acquired after that point in time. For example, the current position of the input apparatus 20 may be calculated by calculating a deviation from the previously acquired position of the input apparatus 20 based on translational acceleration data acquired from the acceleration sensor of the input apparatus 20. While the input apparatus 20 is not imaged by the imaging apparatus 14, the position of the input apparatus 20 is successively calculated in the similar manner. When the input apparatus 20 is imaged again by the imaging apparatus 14, there is a possibility that the position of the input apparatus 20 successively calculated from acceleration data may not indicate a correct position due to cumulative drift error. Therefore, the position of the input apparatus 20 newly calculated by the device information deriving section 84 may be used as the current position of the input apparatus 20. The same is true for the head-mounted display 100.

The game control section 311 executes the game program and progresses the game based on user instruction input acquired by the instruction input acquisition section 312 and information related to the position or attitude of the input apparatus 20 or the head-mounted display 100. The game control section 311 changes the position of a player's character, an operation target, based on input made by directional keys or an analog stick of the input apparatus 20 and a change in position of the input apparatus 20 or the head-mounted display 100 in a game field made up of a virtual three-dimensional (3D) space.

The first image generation section 316 generates an image to be displayed on the head-mounted display 100. The first image generation section 316 generates a game field image by specifying a viewpoint position based on the position of the operation target controlled by the game control section 311, specifying a direction of line of sight based on the attitude of the head-mounted display 100, and rendering a virtual 3D space. The first image generation section 316 associates the attitude of the head-mounted display 100 and the direction of line of sight in the game field at a given time and changes, thereafter, the direction of line of sight with change in the attitude of the head-mounted display 100. As a result, the user can look over the game field by actually moving his or her head, allowing the user to feel as if he or she were really in the game field. The first image generation section 316 generates a first image by adding information related to the game, an image to be displayed on the head-mounted display 100, and so on to the generated game field image. The first image generated by the first image generation section 316 is sent to the head-mounted display 100 via a wireless communication module or a wired communication module.

The second image generation section 317 generates an image to be displayed on the display apparatus 12. When the same image as displayed on the head-mounted display 100 is displayed on the display apparatus 12, the first image generated by the first image generation section 316 is also sent to the display apparatus 12. When an image different from the image displayed on the head-mounted display 100 is displayed on the display apparatus 12, an example of which is when the user wearing the head-mounted display 100 and the user watching the display apparatus 12 execute a head-to-head game, the second image generation section 317 generates a game field image by specifying a viewpoint position and a direction of line of sight different from those specified by the first image generation section 316. The second image generation section 317 generates a second image by adding information related to the game, an image to be displayed on the display apparatus 12, and so on to the generated game field image. The second image generated by the second image generation section 317 is sent to the display apparatus 12 via a wireless communication module or a wired communication module.

Figure 8B:
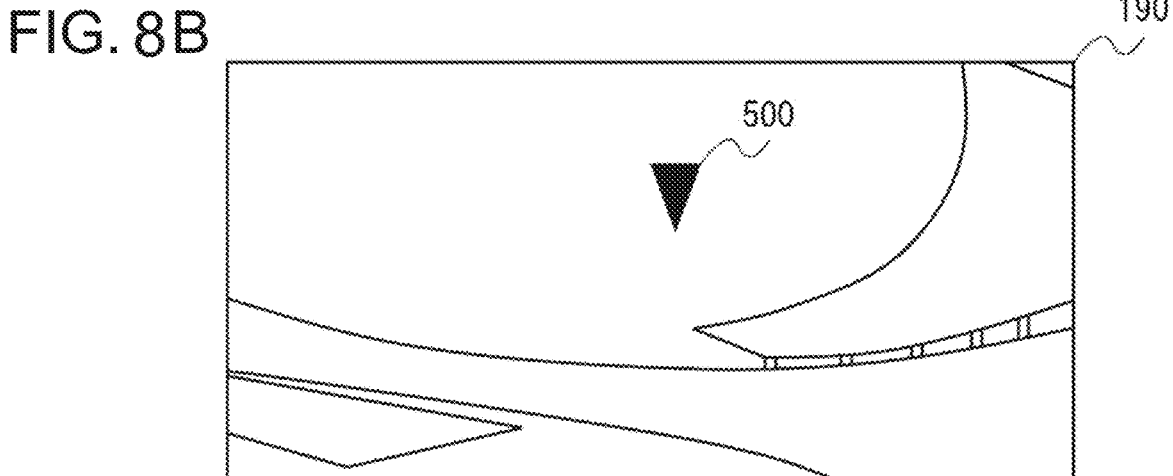
FIGS. 8($a$) to 8($c$) are diagrams illustrating examples of images displayed on the head-mounted display.
Figure 8C:
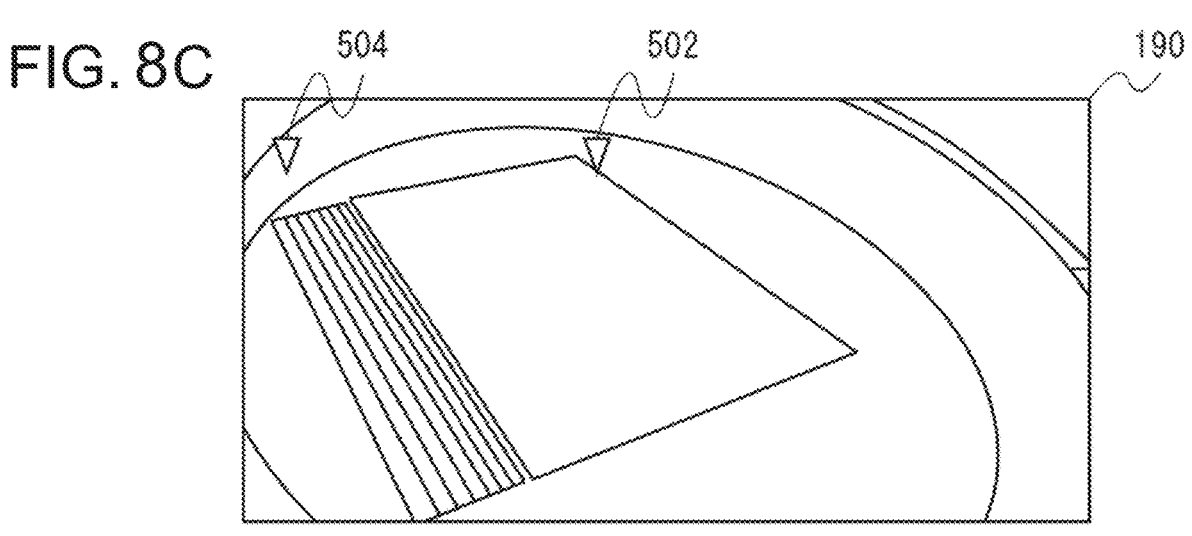

FIG. 8 illustrates examples of images displayed on the head-mounted display. The game control section 311 provides a function to switch the viewpoint position between a plurality of positions specified in the game field. In the display screen depicted in FIG. 8(*a*), a game field image is displayed that was generated with one of a plurality of positions specified in the game field as a viewpoint position. In the display screen, markers 500 and 502 further appear that indicate positions specified as viewpoint positions in the game field. When the user changes the attitude of the head-mounted display 100 by shaking his or her head horizontally and vertically, the first image generation section 316 changes a direction of line of sight in accordance with an attitude of the head-mounted display 100. When it is rendered possible to detect the user's direction of line of sight by providing a camera for shooting the user's eyeballs inside the head-mounted display 100, the direction of line of sight may be changed by further taking into account the user's line of sight. The user's line of sight may be detected by using a known and arbitrary line-of-sight tracking technology.

When the marker enters a given range specified near the center of the display screen as the user points his or her face or line of sight toward the marker direction, as depicted in FIG. 8(*b*), the game control section 311 causes the first image generation section 316 to change the manner in which the marker 500 is displayed, thereby indicating that the position depicted by the marker 500 has been selected as a candidate for specifying a viewpoint position. When the user issues an instruction to change the viewpoint position, for example, by pressing a given button or performing a given gesture with the candidate for specifying a viewpoint position selected, the game control section 311 instructs the first image generation section 316 to change the viewpoint position to the position depicted by the selected marker 500. The first image generation section 316 generates and displays a game field image having the position of the marker 500 as a viewpoint position as depicted in FIG. 8(*c*). In the display screen depicted in FIG. 8(*c*), a marker 504 appears that indicates the position specified as the viewpoint position in the display screen depicted in FIG. 8(*a*).

Figure 9:
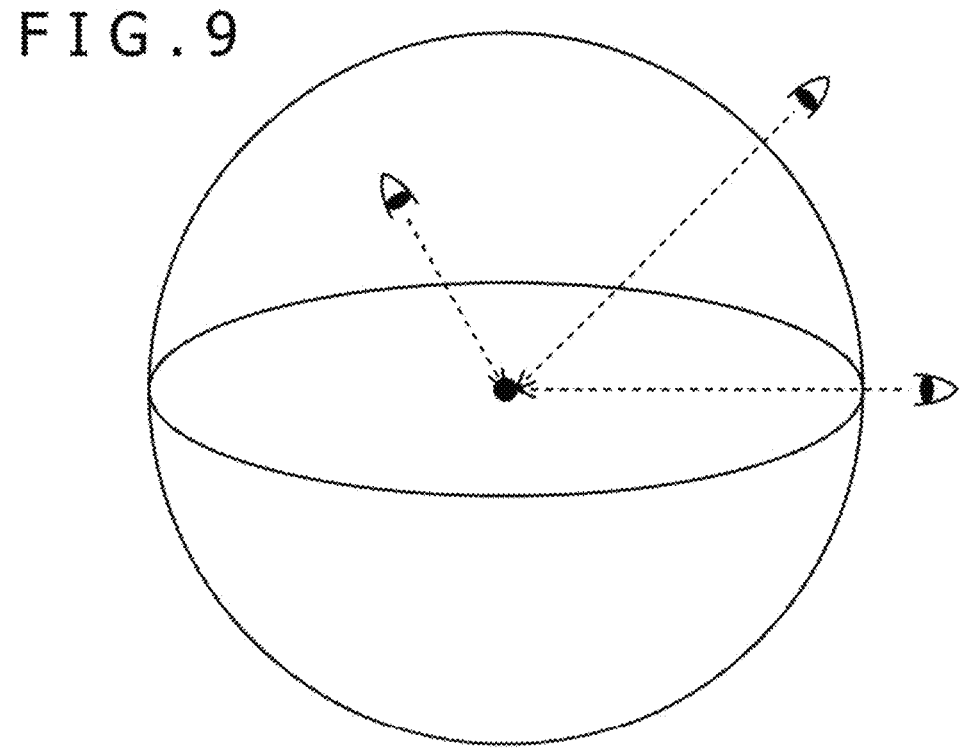
FIG. 9 is a schematic diagram for describing a method of specifying a viewpoint position and a direction of line of sight.

FIG. 9 is a schematic diagram for describing a method of specifying a viewpoint position and a direction of line of sight. In the present embodiment, a viewpoint position is specified on the surface of a sphere having its center near a center of the game field, and a default direction of line of sight is specified in the direction of seeing the first position near the center of the game field from the viewpoint position. As a result, no matter where the viewpoint position is specified, it is possible to display an image that allows the game field to be overlooked. When changing the viewpoint position, the first image generation section 316 smoothly moves the viewpoint position along the sphere surface and generates a game field image by specifying a direction of line of sight in the direction of seeing the first position in the game field from the viewpoint position even while moving the viewpoint position. As a result, it is possible to display an image that allows the game field to be overlooked even while the viewpoint position is changed, thereby making it possible to indicate, in an easy-to-understand manner, to the user where the viewpoint position will be moved even when the viewpoint position is moved to a large extent. It should be noted that a viewpoint position may be provided on the surface of a sphere or a spheroid having its center at an arbitrary point in the game field or on a curved surface other than that. Also, when the viewpoint position is changed, the viewpoint position may be continuously changed in a linear or curved manner from the viewpoint position before the change to the viewpoint position after the change. In the example depicted in FIG. 8, the surface of a lower hemisphere is underground. Therefore, a viewpoint position can be specified only on the surface of an upper hemisphere. However, when the game field is, for example, an outer space, viewpoint positions may be specified on the surface of the lower hemisphere.

Figure 10A:
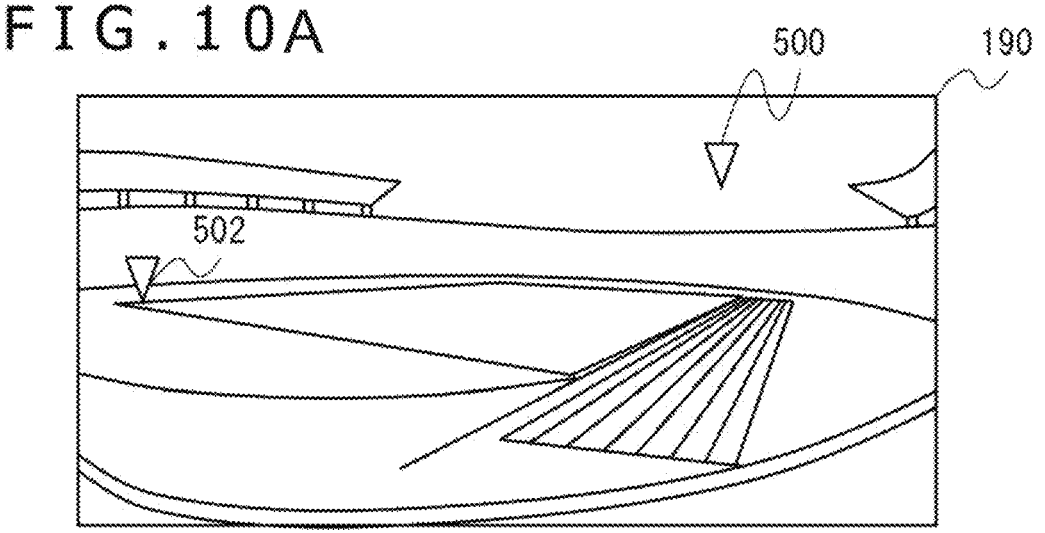
FIGS. 10($a$) and 10($b$) are diagrams illustrating examples of images displayed on the head-mounted display.
Figure 10B:
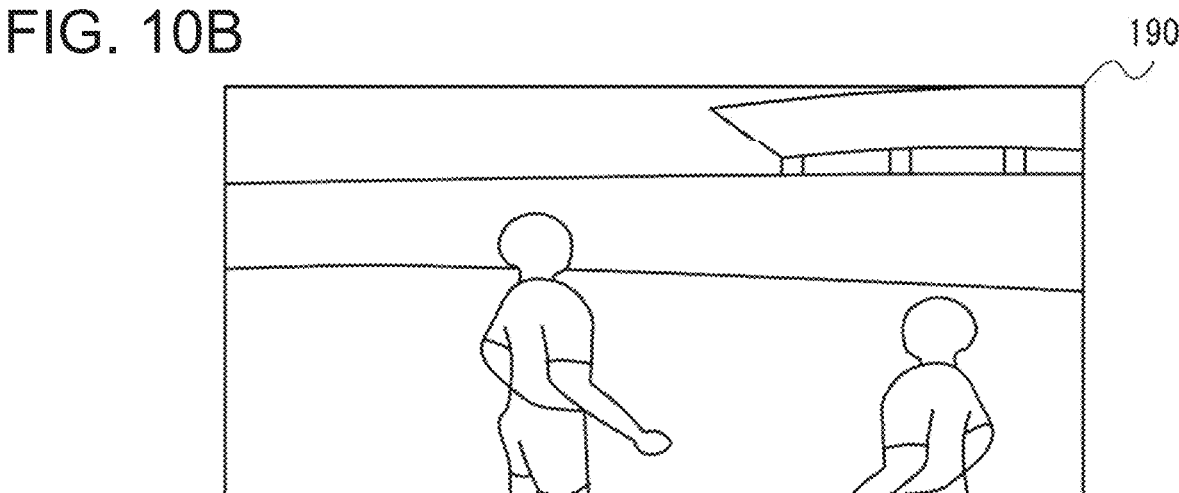

FIG. 10 illustrates examples of images displayed on the head-mounted display. If the user moves the head-mounted display 100 forward by moving his or her head forward when a game field image as seen from a viewpoint position is displayed as depicted in FIG. 10(*a*), the game control section 311 causes the first image generation section 316 to move the viewpoint position to a second position near the center of the game field. The game control section 311 may move the viewpoint position when the head-mounted display 100 is moved forward by as much as or more than a given amount of travel. Alternatively, the game control section 311 may move the viewpoint position when the head-mounted display 100 travels at a speed equal to or more than a given value. As a result, the viewpoint position can be moved to near the center of the game field from spectators' seats as depicted in FIG. 10(*b*). Therefore, the user who was watching, for example, a soccer game from a spectator's viewpoint can feel as if he or she entered the field where the game is taking place. Also, it is possible to provide an easy-to-understand method of moving the viewpoint using the head-mounted display 100.

Figure 11:
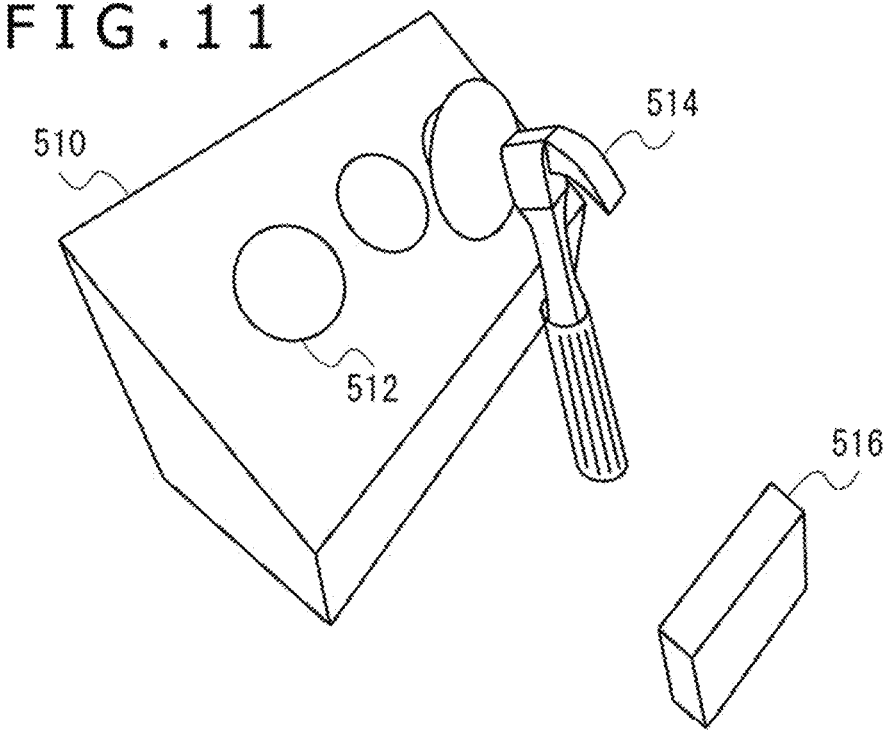
FIG. 11 is a schematic diagram for describing details of another game provided by a game control section.

FIG. 11 is a schematic diagram for describing details of another game provided by the game control section. In the game depicted in the present figure, the user hides inside a box 510 having holes 512 and pops up his or her face from a hole 512 while being careful not to be hit by a hammer 514 and reads letters written on a plate 516. The game control section 311 changes the viewpoint position based on the position of the head-mounted display 100. The game control section 311 determines the hole 512 to be hit with the hammer 514 at a given timing and swings down the hammer 514 into the determined hole 512. We assume that if the hammer 514 is swung down into the hole 512 when the user's viewpoint position is above and outside the hole 512, the user is hit with the hammer 514. If the user is hit a given number of times or more with the hammer 514, the game is over.

FIG. 12 depicts diagrams illustrating examples of images displayed on the head-mounted display. FIG. 12(*a*) depicts a game screen when the user looks up from the middle hole. The hammer is about to be swung down into the middle hole. FIG. 12(*b*) depicts a game screen when the user has moved the viewpoint position to under the right hole by moving the head-mounted display 100 to the right. Because the hammer is about to be swung down into the middle hole, the hammer will not be swung down into the right hole for a while. At this time, if the user moves up the viewpoint position from the right hole by moving up the head-mounted display 100, the user can visually recognize the letters written on a plate provided outside the box as depicted in FIG. 12(*c*).

Figure 13:
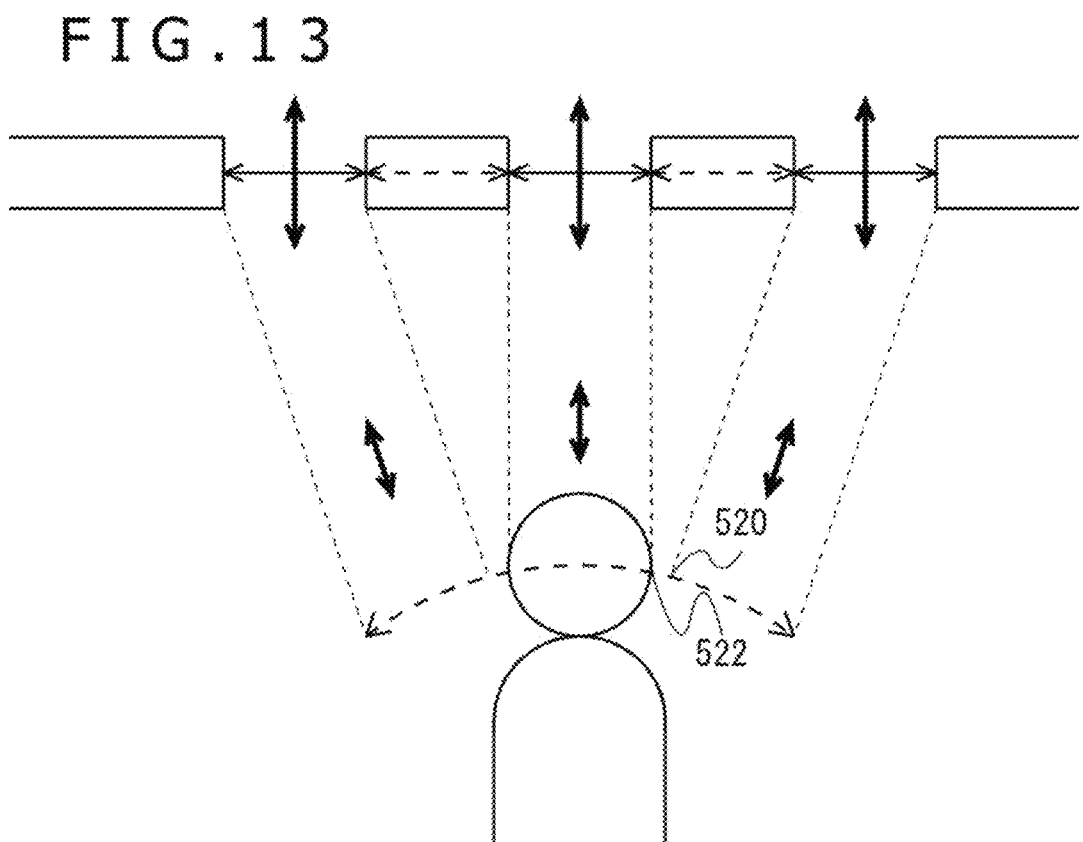
FIG. 13 is a schematic diagram for describing a method of moving the viewpoint position in a game according to the embodiment.

FIG. 13 is a schematic diagram for describing a method of moving the viewpoint position in a game according to the embodiment. When the user plays a game seated, for example, in a chair, the hip position is fixed. Therefore, the user moves his or her head in a circular arc. However, the possible range of head motion that causes no hindrance to the game is approximately 100 to 120 degrees at most. In order to make effective use of the possible motion range of the head-mounted display 100, therefore, the game control section 311 moves the viewpoint position to a greater extent when the head-mounted display 100 is moved horizontally than when the head-mounted display 100 is moved perpendicularly. Also, if the amount of travel exceeds the amount equivalent to the width of the middle hole when the head-mounted display 100 is moved to the left or right, the area between the middle hole and the left or right hole is skipped, moving the viewpoint position to under the left or right hole.

Specifically, if the head-mounted display 100 is moved to the right while the viewpoint position is located under the middle hole, and when the head-mounted display 100 reaches a position 520, the viewpoint position jumps from the right edge position of the middle hole to the left edge position of the right hole. Also, if the head-mounted display 100 is moved to the left while the viewpoint position is located under the right hole, and when the head-mounted display 100 reaches a position 522, the viewpoint position jumps from the left edge position of the right hole to the right edge position of the middle hole. As a result, the viewpoint position is not moved to an area to which there is no or only a slight need to move the viewpoint position in a game, whereas the viewpoint position can be moved to only given areas to which there is need to move the viewpoint position or to which the viewpoint position is often moved, thereby making effective use of the possible motion range of the head-mounted display 100 and moving the viewpoint position. Also, it is possible to provide a user interface that permits movement of the viewpoint position with ease by moving the head-mounted display 100 even without using, for example, the input apparatus 20, thereby ensuring improved user convenience. A hysteresis is provided by using different positions, the position 520 for causing the viewpoint position to jump for rightward movement and the position 522 for causing the viewpoint position to jump for leftward movement, thereby reducing the likelihood for the viewpoint position to jump to the left and right frequently when the head-mounted display 100 is at an angle equivalent to a position in the neighborhood of a threshold.

When an attempt is made to move the viewpoint position to above the left or right hole, it is necessary to move the head-mounted display 100 upward while keeping the head-mounted display 100 tilted to the left or right. However, it is not easy for the user to move his or her head straight upward while keeping the body tilted to the left or right. In the present embodiment, therefore, when the head-mounted display 100 is moved up or down in a tilted position to the left or right, and even if the direction of movement is tilted diagonally, the game control section 311 moves the viewpoint position vertically, but not horizontally. The game control section 311 moves the viewpoint position vertically by the amount of travel equivalent to a vertical component of a movement vector of the head-mounted display 100 and may ignore a horizontal component or move the viewpoint position vertically by the amount of travel equivalent to the magnitude of the movement vector of the head-mounted display 100. Thus, when the viewpoint position is changed in response to movement of the head-mounted display 100, it is possible to restrict the movement direction of the viewpoint position to a given direction and prevent the viewpoint position from moving in an unnecessary direction by converting the movement vector of the head-mounted display 100 into a vector in a given direction. Also, it is possible to provide a user interface that permits the movement of the viewpoint position only in a necessary direction, thereby ensuring improved user convenience.

Such a technology is applicable, for example, to a game in which a player's character hides behind an obstacle such as wall to ward off oncoming bullets.

The present invention has been described above based on an embodiment. The present embodiment is illustrative, and it is to be understood by those skilled in the art that the combination of components and processes thereof can be modified in various ways and that these modification examples also fall within the scope of the present invention.

Although an image for binocular stereopsis was displayed on the display apparatus 190 of the head-mounted display 100 in the above example, an image for monocular stereopsis may be displayed in a different example.

Although the head-mounted display 100 was used in a game system in the above example, the technology described in the embodiment can be also used to display content other than games.

REFERENCE SIGNS LIST

10 Gaming apparatus, 20 Input apparatus, 100 Head-mounted display, 190 Display apparatus, 311 Game control section, 312 Instruction input acquisition section, 314 HMD information acquisition section, 315 Input apparatus information acquisition section, 316 First image generation section, 317 Second image generation section.

INDUSTRIAL APPLICABILITY

The present invention is applicable to a display control apparatus for controlling display to a head-mounted display.

The invention claimed is:

1. A display control apparatus comprising:
one or more memory devices configured to store instructions; and
one or more processors, that upon execution of the instructions, are configured to:
specify a plurality of positions in a virtual space;
display a first image including one or more markers indicative of one or more positions on a screen of a head mount display (HMD);
change a manner of displaying a marker among the one or more markers to indicate a position depicted by the marker;
change a viewpoint position to the position depicted by the marker in accordance with a user operation specifying the position depicted by the marker as the viewpoint position;
and
display the first image including the marker as the viewpoint position based on the virtual space on the HMD and a second image based on the virtual space on a display device other than the HMD.

2. The display control apparatus of claim 1, wherein the first image and the second image are at the viewpoint position.

3. The display control apparatus of claim 1, wherein the first image is at the viewpoint position and the second image is at a second viewpoint position different from the viewpoint position.

4. The display control apparatus of claim 1, wherein at least some of the one or more positions are separate from each other.

5. The display control apparatus of claim 1, wherein the one or more processors are configured to continuously move the viewpoint position in a linear manner or a curved manner from the viewpoint position upon the change to the viewpoint position.

6. The display control apparatus of claim 1, wherein the one or more processors are configured to move the viewpoint position to another viewpoint position in the virtual space either when the HMD is moved by a distance that is equal to or farther than a given distance or when the HMD is moved at a speed that is equal to or faster than a given speed.

7. The display control apparatus of claim 1, wherein the one or more processors, that upon execution of the instructions, are configured change the manner of displaying the marker to indicate the position when the marker enters a given range from a center of the screen.

8. A method comprising:
specifying a plurality of positions in a virtual space;
displaying a first image including one or more markers indicative of one or more positions on a screen of an HMD;
changing a manner of displaying a marker among the one or more markers to indicate a position depicted by the marker is a candidate viewpoint position;
changing a viewpoint position to the position depicted by the marker in accordance with a user operation specifying the position depicted by the marker as the viewpoint position;
and
displaying the first image including the marker as the viewpoint position based on the virtual space on the HMD and a second image based on the virtual space on a display device other than the HMD.

9. The method of claim 8, wherein the first image and the second image are at the viewpoint position.

10. The method of claim 8, wherein the first image is at the viewpoint position and the second image is at a second viewpoint position different from the viewpoint position.

11. The method of claim 8, wherein at least some of the one or more viewpoint positions are separate from each other.

12. The method of claim 8, further comprising continuously moving the viewpoint position in a linear manner or a curved manner from the viewpoint position upon the change to the viewpoint position.

13. The method of claim 8, further comprising moving the viewpoint position to another viewpoint position in the virtual space either when the HMD is moved by a distance that is equal to or farther than a given distance or when the HMD is moved at a speed that is equal to or faster than a given speed.

14. The method of claim 8, wherein changing the manner of displaying the marker to indicate the position is performed when the marker enters a given range from a center of the screen.

15. A non-transitory, computer-readable recording medium containing a computer program, which when executed by a computer, causes the computer to perform a method by carrying out actions comprising:
specifying a plurality of positions in a virtual space;
displaying a first image including one or more markers indicative of one or more positions on a screen of an HMD;
changing a manner of displaying a marker among the one or more markers to indicate a position depicted by the marker is a candidate viewpoint position;
changing a viewpoint position to the position depicted by the marker in accordance with a user operation specifying the position depicted by the marker as the viewpoint position;
and
displaying the first image including the marker as the viewpoint position based on the virtual space on the HMD and a second image based on the virtual space on a display device other than the HMD.

16. The non-transitory, computer-readable recording medium of claim 15, wherein the computer program, which when executed by the computer, causes the computer to perform the method by carrying out actions, wherein displaying the first image and displaying the second image are at the viewpoint position.

17. The non-transitory, computer-readable recording medium of claim 15, wherein the computer program, which when executed by the computer, causes the computer to perform the method by carrying out actions, including displaying the first image the viewpoint position and displaying the second image is at a second viewpoint position different from the viewpoint position.

18. The non-transitory, computer-readable recording medium of claim 15, wherein at least some of the one or more viewpoint positions are separate from each other.

19. The non-transitory, computer-readable recording medium of claim 15, wherein the computer program, which when executed by the computer, causes the computer to perform the method by carrying out actions, including continuously moving the viewpoint position in a linear manner or a curved manner from the viewpoint position upon the change to the viewpoint position.

20. The non-transitory, computer-readable recording medium of claim 15, wherein the computer program, which when executed by the computer, causes the computer to perform the method by carrying out actions, including moving the viewpoint position to another viewpoint position in the virtual space either when the HMD is moved by a distance that is equal to or farther than a given distance or when the HMD is moved at a speed that is equal to or faster than a given speed.

* * * * *